United States Patent [19]

Clerke et al.

[11] Patent Number: 4,852,069
[45] Date of Patent: Jul. 25, 1989

[54] THIN BED EVALUATION DEVICE

[75] Inventors: Edward A. Clerke, Missouri City; Brent H. Larson, Sugarland, both of Tex.

[73] Assignee: Shell Oil Company, Houston, Tex.

[21] Appl. No.: 948,206

[22] Filed: Dec. 31, 1986

[51] Int. Cl.$^4$ .............................................. G01V 1/00
[52] U.S. Cl. ...................................... 367/69; 367/35; 367/911; 181/105; 73/151; 324/323
[58] Field of Search ..................... 367/25-35, 367/69, 911, 912; 181/102-106, 108, 110-113; 73/151; 324/323, 333, 366, 367

[56] References Cited

U.S. PATENT DOCUMENTS

| 3,369,626 | 2/1968 | Zemanek, Jr. | 367/69 |
| 3,475,722 | 10/1969 | White | 367/911 X |
| 3,478,839 | 11/1969 | Zemanek, Jr. | 367/25 X |
| 3,526,874 | 9/1970 | Schwartz | 340/15.5 |
| 3,542,150 | 11/1970 | Youmans | 181/104 |
| 3,564,914 | 2/1971 | Desai et al. | 181/102 X |
| 3,794,976 | 2/1974 | Mickler | 367/28 X |
| 3,883,841 | 5/1975 | Norel et al. | 181/102 X |
| 3,962,674 | 6/1976 | Howell | 340/15.5 |
| 4,463,378 | 7/1984 | Rambow | 367/69 X |
| 4,524,432 | 6/1985 | Johnson | 367/25 |
| 4,601,024 | 7/1986 | Broding | 367/86 |
| 4,641,724 | 2/1987 | Chow et al. | 181/104 |
| 4,646,565 | 3/1987 | Siegfried | 181/105 X |

FOREIGN PATENT DOCUMENTS

| 1193381 | 5/1970 | United Kingdom . |
| 1305351 | 1/1973 | United Kingdom . |
| 2001442A | 1/1979 | United Kingdom . |
| 2034888A | 6/1980 | United Kingdom . |
| 1582714 | 1/1981 | United Kingdom . |
| 2154320A | 9/1985 | United Kingdom . |

Primary Examiner—Brian S. Steinberger

[57] ABSTRACT

The microstructure of thinly laminated earth formations is acoustically determined with a logging tool having an acoustical transducer pad mounted for measuring while in contact with the borehole wall.

4 Claims, 2 Drawing Sheets

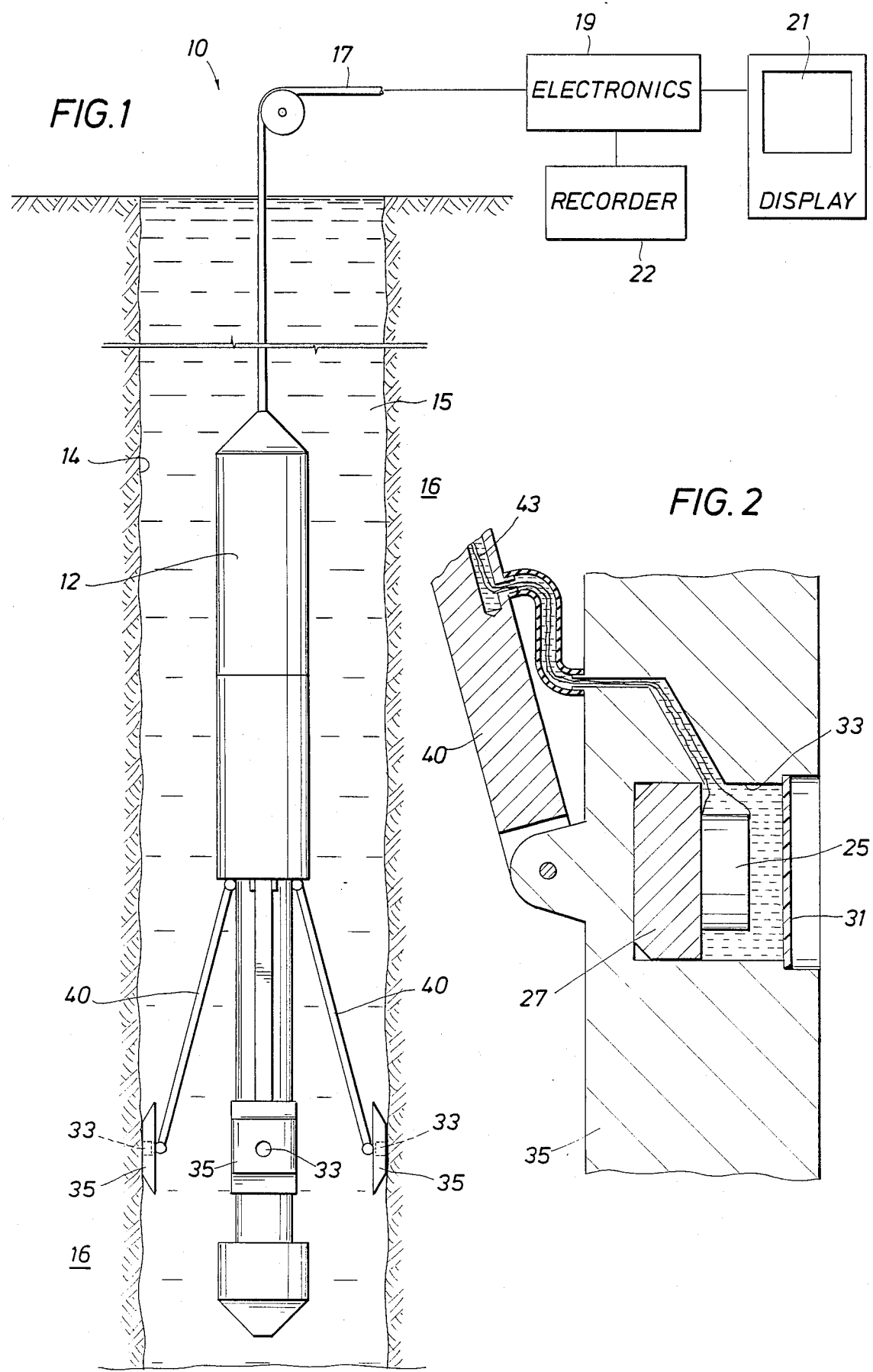

THIN BED EVALUATION DEVICE

BACKGROUND OF THE INVENTION

The present invention relates to well logging, and in particular to a new method and apparatus for acoustically imaging the wall of a bore-hole in fine detail to determine the microstructure of the formations penetrated by the borehole. The invention, which utilizes some acoustical imaging techniques similar to those used with borehole televiewers (BHTV's), is distinct from borehole televiewers in terms of the type of image and detail generated and the precise means by which it is done. However, the invention is particularly useful in conjunction with tools such as borehole televiewers, as will be explained further below.

In this regard, reference may be made to several patents relating to borehole televiewers, such as U.S. Pat. Nos. 3,369,626 (Zemanek, Jr., issued Feb. 20, 1968), 3,478,839 (Zemanek, Jr., issued Nov. 18, 1969), 4,463,378 (Rambow, issued July 31, 1984), and 4,601,024 (Broding, issued July 15, 1986). In general, such borehole televiewer logging tools operate acoustically by periodically pulsing a rotating acoustic transducer to emit a sequence of acoustical pulses directionally into the borehole toward the borehole wall, and analyzing the echoes which are reflected back to the tool. The amplitude of the reflected signal may then be displayed on a cathode ray tube, the display sometimes being photographed for future reference. Typically, the display represents a map of the borehole wall split along the north direction and laid out flat. Alternately, a polar display may be produced, in which case the radius of the circular trace is determined by the time-of-flight of the acoustic pulse, thus presenting a cross-sectional profile of the borehole. Another display, similar to the amplitude display, is modulated by the time-of-flight signal rather than the amplitude signal. The latter can be converted into a pseudo-three-dimensional image by adding a slight bias to the vertical sweep according to the magnitude of the time-of-flight signal.

The higher the resolution, of course, the more valuable will be the information reported by BHTV logging tools. In the recent past, substantial improvements have been made in the physical design and choice of materials for ever better resolution of the images. As will become apparent, however, due to the competing objectives there will probably always be certain compromises forced upon borehole televiewer type logging tools. That is, a primary objective is to provide a complete "visual" image. This requires an essentially continuous scan around the circumference of the borehole wall. Thus, to scan or read so many contiguous target elements, the solution adopted has been to locate the tool centrally within the borehole and scan a beam radially around the borehole, bouncing it off the target points on the borehole wall back to the borehole televiewer. To physically contact and read the same number of points would appear to be highly impractical.

Thus, since the acoustical transducer is accordingly located some distance away from its target, a certain loss of resolution is to be expected. First, from the very nature of the transducer, it can be expected that the target size or footprint of the transmitted acoustical beam, at the borehole wall, will expand somewhat from its size nearer to the transducer (depending, of course, on the particular characteristics at hand). A certain scattering of the acoustical energy will also take place as it propagates through the various media in the BHTV and within the borehole. Additionally, since the borehole wall is rarely smooth and flat, the beam will be somewhat scattered or jumbled by different reflecting surfaces at different angles within the area of the footprint on the borehole wall. This effect will be effectively increased generally in relation to the distance of the target area on the borehole wall from the acoustical transducer in the borehole televiewer. Accordingly, thinly laminated formation beds (e.g., less than $\frac{1}{8}$ inch), often seen, for example, in certain depositional environments, may not be well resolved with such tools. The problems can be exaggerated in heavy mud weights, large diameter boreholes, or in wash-out zones within the well.

SUMMARY OF THE INVENTION

Briefly, the present invention meets the above needs and purposes with a method and apparatus for acoustically imaging the wall of a borehole, and is particularly well adapted for determining the microstructure of the formations penetrated thereby. By eschewing development of a complete visual image, the present invention concentrates intead upon the extremely fine detail on, for example, a line or linear trace moving vertically across the thinly bedded or laminated formation. Therefore, although the present invention uses acoustical reflection techniques similar to those with borehole televiewers, the present invention does not seek to construct a pseudo-visual image, but rather unfolds the detail of very thinly laminated beds in a more linear fashion. In the preferred embodiment, this is accomplished by locating the transducer very close to the formations themselves.

Preferably, the transducer pad assembly will be in close proximity or almost in contact with the actual formation being examined. In practice, in order to protect the acoustical transducer from damage, it will be mounted in a transducer assembly, such as a pad mounted on an extendable arm, which supports the transducer as close as practicable to the borehole wall. This yields the highest resolution and minimizes the potential for the borehole fluids, debris, etc., to interfere with the acoustical energy signal as it examines the thinly laminated beds.

In its simplest embodiment, therefore, the present invention incorporates a transducer assembly and means for positioning the transducer assembly substantially in contact with the borehole wall for directing acoustical energy toward the wall of the borehole. The transducer assembly then receives the acoustical energy reflected from the borehole wall and transmits it to suitable imaging equipment which constructs the desired image of the microstructure of the formation being examined. As indicated, such an image can simply be a linear trace representing one or more of the characteristics of the reflected energy. Such characteristics, for example, might be amplitude, acoustic transit time, and so forth.

One possible characteristic of interest, in addition to amplitude and/or time of flight, would be the amount of scattering of the acoustical energy. Another embodiment of the invention, therefore, includes means for receiving the reflected energy not only on the axis of the transducer assembly, but from off the axis thereof as well. This provides a direct measure of the scattering which occurs at the formation surface, which in turn can give information about microfractures, grain size effects, particle spacing, rock texture, formation lithology, and/or porosity.

Since the pad can be positioned in contact with the formation, other direct measurements of the formation can advantageously be made simultaneously. For example, a button for measuring formation resistivity can be incorporated into the pad so that information about the resistivity of the thinly laminated beds can be obtained as well, at very small additional cost.

It is therefore an object of the present invention to provide an improved method and apparatus for acoustically imaging the wall of a borehole to determine the microstructure of the formations penetrated thereby; such a method and apparatus in which acoustical energy is directed toward the wall of such a borehole from a transducer assembly substantially in contact with the wall; in which the transducer assembly receives the acoustical energy reflected from the borehole wall; in which a measure of the microstructure of the formation is then determined from the received reflected acoustical energy; in which the transducer assembly may be a pad; in which reflected energy off the axis of the primary transducer may also be received; in which the results of the microstructure measurement may be combined with measurements from a borehole televiewer for improved interpretation of thinly laminated zones in the formations penetrated by the borehole; and to accomplish the above objects and purposes in an inexpensive, uncomplicated, durable, versatile, and reliable method and apparatus, inexpensive to manufacture and implement, and readily suited to the widest possible utilization in the close examination of thinly bedded formations penetrated by a borehole.

These and other objects and advantages of the invention will be apparent from the following description, accompanying drawings, and the appended claims.

BRIEF DESCRIPTION OF THE DRAWINGS

FIG. 1 is a somewhat figurative side view showing a borehole logging apparatus according to the present invention located within a borehole.

FIG. 2 is a cross sectional view of one of the transducer pads shown in FIG. 1.

DESCRIPTION OF THE PREFERRED EMBODIMENT

Figure 3:
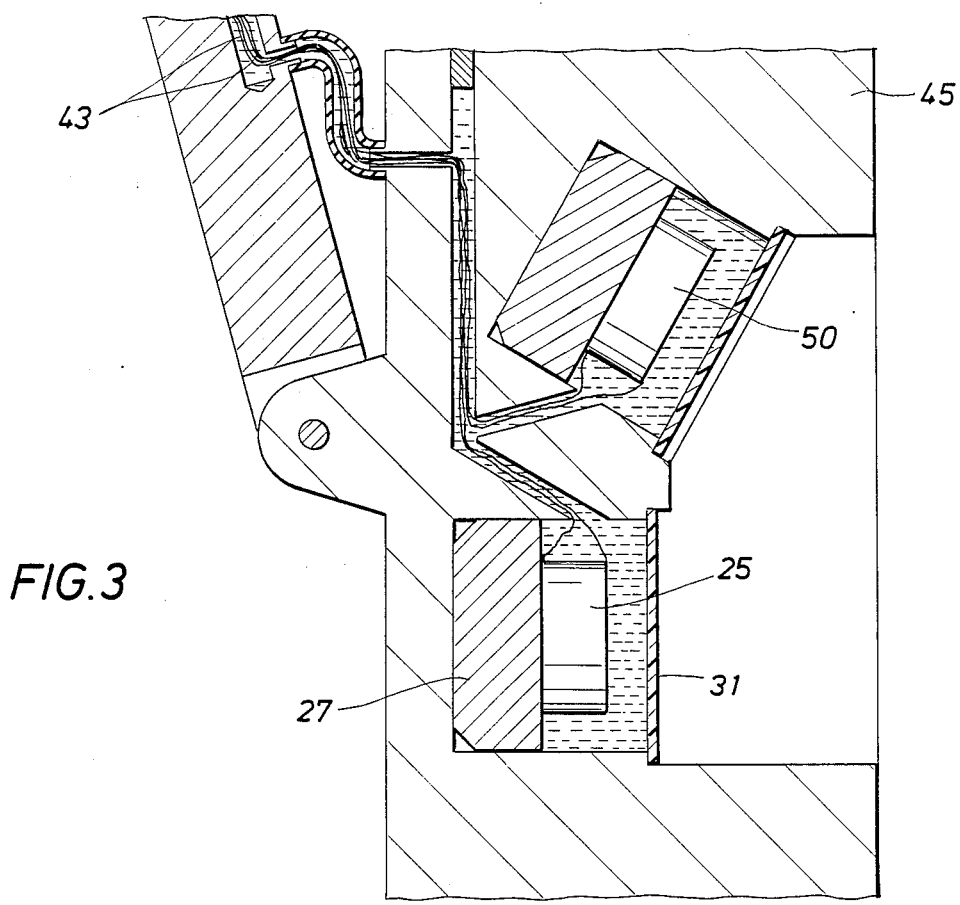
FIG. 3 is a cross sectional view similar to that of FIG. 2 showing another transducer pad embodiment.

With reference to the drawings, the new and improved borehole imaging apparatus, and the method for imaging a borehole therewith, according to the present invention, will be described. A borehole logging system 10, including a downhole sonde having a housing 12, is positioned in a borehole 14 filled with a fluid drilling mud 15. Borehole 14 penetrates various earth formations 16 which are to be imaged by the system.

The sonde housing 12 is supported in borehole 14 by a conventional logging cable 17. Cable 17 provides both physical support for moving the sonde vertically within borehole 14, and also is a communications ions link between the electronics package located in housing 12 and the surface electronics 19 located at the top of borehole 14. System 10 may also include a suitable display unit 21 such as a CRT display, and a recorder such as a video recorder 22.

As discussed above, the logging system 10 is to be distinguished from borehole televiewers, but in fact can be used effectively to complement the formation data being developed by a borehole televiewer. For this purpose, therefore, the housing 12 has a line drawn thereacross suggesting that it could be made up of several logging modules combined, in conventional fashion, in a tool string, one of which could be a borehole televiewer.

In accordance with the present invention, a preferred embodiment thereof incorporates a plurality of acoustical transducers 25, each supported on an appropriate backing 27 received behind a suitable protective window 31 in a recess or cavity 33 in a plurality of respective transducer pad assemblies 35. The pads 35 are supported for extension outwardly on arms 40 from the body of housing 12 for direct contact with the earth formations 16 at the surface of borehole 14, as illustrated in FIG. 1. Suitable conductor(s) 43 connect the transducers 25 to the electronics package (not shown) located within housing 12. In conventional fashion, the arms 40 are preferably also retractable to assist in moving the logging tool through portions of the borehole which are not being logged.

With this configuration, mud attenuation is significantly reduced and the transducer-to-wall spacing can be controlled by the pad design. Resolution down to three millimeters or less can be expected, depending upon the frequency and configuration of the transducers. Due to the close proximity to the earth formations 16, attenuation of the acoustical signal due to the drilling mud 15 will be much less of a problem than in conventional borehole televiewers. Thus, higher frequencies can be used with the acoustical transducer and heavier mud weight can be logged (both of which parameters cause increased acoustical signal attenuation), producing much higher resolution even in the most difficult logging conditions. Also, by appropriately controlling the pad dimensions (e.g., thickness), the pads can be designed to hold the transducers at their optimum distance from the earth formations. Typically, this would be at the distance where the beam waist is at a minimum for maximum resolution.

FIG. 3 shows a pad 45 incorporating a second transducer 50. Transducer 50 is an off-axis transducer which can be advantageously used for determining the amount of scattering of the acoustic energy that occurs at the formation surface. Although used primarily as just a listening device, in this embodiment the transducer 50 can advantageously be similar to transducer 25, and thus, also capable of generating acoustic energy as well. By thus detecting and registering the amount of scattering of the energy, information can be provided about microfractures, grain size effects, particle spacing, rock texture, lithology, and/or porosity.

Figure 4:
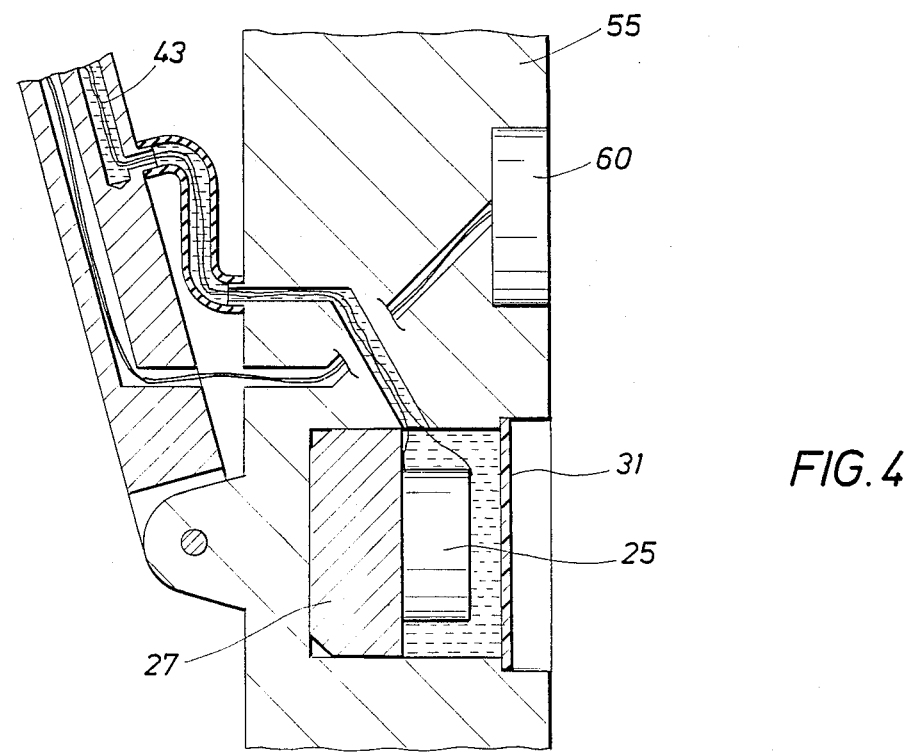
FIG. 4 is another cross sectional view similar to FIGS. 2 and 3 showing still a third transducer pad embodiment.

FIG. 4 illustrates still another pad embodiment 55 in which an electrical button 60 is positioned for contacting the earth formations 16 for measuring the formation resistivity from the pad 55. By combining the acoustical transducer 25 with the resistivity pad 55, additional information about the true resistivity of the complex formation being studied can be obtained. Advantageously, the incremental costs of this additional resistivity measurement are very small.

As may be seen, therefore, the present invention has numerous advantages. In the preferred embodiment, three, four, or more pads 35, 45, or 55 will be mounted on a corresponding number of respective arms 40 distributed around the tool housing 12. These can be maintained in their extended position (FIG. 1), for example, in known fashion by means of appropriate springs, the effect of which would be to help centralize the tool housing 12. As suggested earlier, an additional advantage of the invention is to combine it with a borehole televiewer so that the respective measurements can be combined for improved interpretation of thinly laminated zones in the formations penetrated by the borehole. Since most borehole televiewers include centralizers, the present invention can be combined therewith while simplifying the mechanical design. Accordingly, the present invention provides a new method and apparatus for high resolution evaluation and unfolding of the structure of thinly laminated beds which is not only inexpensive and uncomplicated, but is also versatile and readily suited to the widest possible utilization in the fine evaluation of such difficult formations.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for acoustically imaging the wall of a borehole to determine the structure of strata less than 1/3 inch in the formations penetrated thereby, comprising:

directing acoustical energy toward the wall of such a borehole from a plurality of transducer pads substantially in contact with the wall;

receiving in the respective transducer pads the acoustical energy reflected from the borehole wall, said receiving being both substantially on the axis of the transducer assembly and from off the axis thereof as well;

determining from the received reflected acoustical energy an image of the structure of the formation;

measuring the formation resistivity from the transducer assembly; and combining the results of said determining step with measurements from a borehole televiewer for improved interpretation of laminated zones in the formations penetrated by the borehole.

2. Apparatus for acoustically imaging the wall of a borehole to determine the structure of strata less than $\frac{1}{3}$ inch in the formations penetrated thereby, comprising:

a plurality of transducer pad means for directing acoustical energy toward the wall of such a borehole;

means for positioning said transducer pad means substantially in contact simultaneously with a plurality of locations on the wall;

means in the respective said transducer pad means for receiving said acoustical energy reflected from the borehole wall both substantially on the axis of the respective said transducer pad means and from off the axis thereof as well;

means for determining from said received reflected acoustical energy an image of the structure of the formation;

said pad means including means for measuring the formation resistivity; and means for combining said received reflected acoustical energy with measurements from a borehole televiewer for improved interpretation of laminated zones in the formations penetrated by the borehole.

3. A method for acoustically imaging the wall of a borehole to determine the structure of strata less than $\frac{1}{3}$ inch in the formations penetrated thereby, comprising:

holding an acoustical transducer in acoustical contact with the borehole fluid at a predetermined finite distance from the wall of such a borehole by supporting the transducer with a pad substantially in contact with the wall;

directing acoustical energy toward the wall of such a borehole from the transducer;

receiving in the pad the acoustical energy reflected from the borehole wall;

determining from the received reflected acoustical energy an image of the structure of the formation; and measuring the formation resistivity from the pad.

4. Apparatus for acoustically imaging the wall of a borehole to determine the structure of strata less than $\frac{1}{3}$ inch in the formations penetrated thereby, comprising:

an acoustical transducer;

pad means holding said acoustical transducer in acoustical contact with the borehole fluid at a predetermined finite distance from the wall of such a borehole when said pad means is substantially in contact with the wall, for directing acoustical energy toward the wall of such a borehole;

means for positioning said pad means substantially in contact with the wall;

means in said pad means for receiving said acoustical energy reflected from the borehole wall;

means for determining from said received reflected acoustical energy an image of the structure of the formation; and means in said pad means for measuring the formation resistivity.

* * * * *